United States Patent

Whittemore

[15] 3,649,073
[45] Mar. 14, 1972

[54] RETRACTABLE VEHICLE COVER

[72] Inventor: James R. Whittemore, 1114 Clancy, N.E., Albuquerque, N. Mex. 87112

[22] Filed: Nov. 2, 1970

[21] Appl. No.: 85,990

[52] U.S. Cl. ................................296/137 B, 52/66, 296/100
[51] Int. Cl. .........................................................B60j 7/08
[58] Field of Search............296/26, 27, 99, 100, 107, 137 B; 52/66

[56] References Cited

UNITED STATES PATENTS

| 1,079,205 | 11/1913 | Beebe | 296/98 |
| 3,202,455 | 8/1965 | Grotz | 296/100 |
| 3,304,670 | 2/1967 | Logan | 52/66 |
| 3,582,130 | 6/1971 | Borskey | 296/137 B |

Primary Examiner—Benjamin Hersh
Assistant Examiner—Winston H. Douglas
Attorney—James H. Phillips

[57] ABSTRACT

In order to protect items being carried in a vehicle open-topped compartment, such as a pickup truck bed, a trailer, or a towed boat, against pilferage and weather, a close fitting cover is provided which utilizes a mechanism which permits translation of the cover between an upper, open position, and a lower closed position. The mechanism includes mirror image components on each side of the vehicle for coupling the compartment and cover. The mechanism includes a first inverted "U" frame member pivotally secured at its lower ends to forward mounted brackets within the compartment and a second inverted "U" frame member disposed somewhat aft of the center of the compartment and pivotally secured at its lower ends to a second set of brackets. Rollers arranged at the top of the inverted "U" frame members roll fore and aft in channels within the cover and provide vertical support for the cover. Fore and aft links are hingedly secured to the frame members at their upper crossmembers to constrain the legs of the frame members to remain parallel. A pair of guide links are pivotally fixed at their lower ends to the legs of the rearmost frame member at a point above the lower pivot points of the frame member and are pivotally fixed at their upper ends to the cover at a fore and aft position intermediate the corresponding positions of the bracket pairs. A pair of tension springs are fixed between the legs of the forward frame member and the fore and aft links to provide a counterbalance effect.

3 Claims, 4 Drawing Figures

Patented March 14, 1972
3,649,073
2 Sheets-Sheet 1
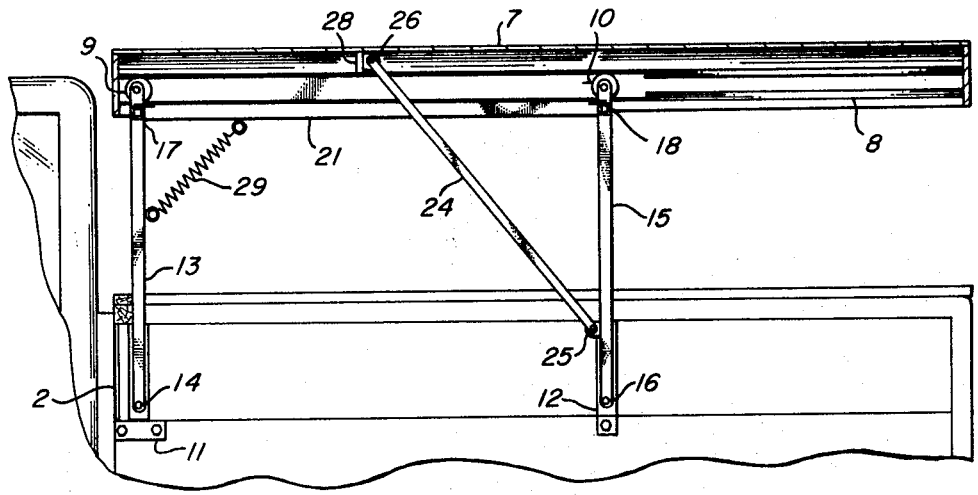
Fig. 2
Fig. 1
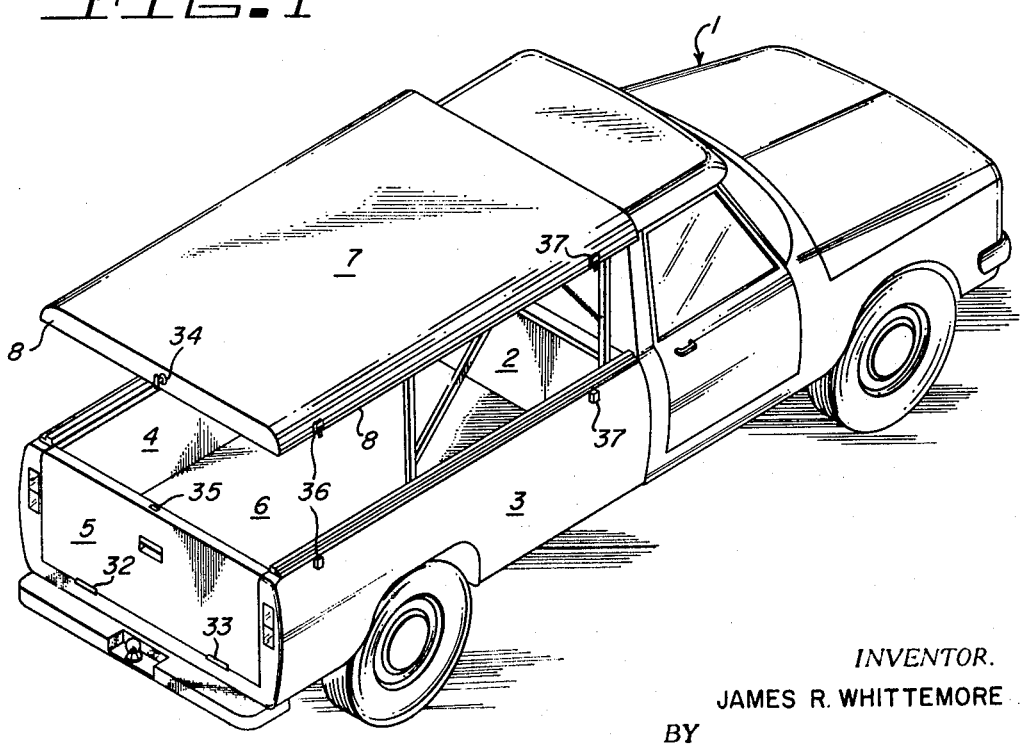
INVENTOR.
JAMES R. WHITTEMORE
BY
James H. Phillips
ATTORNEY Patented March 14, 1972

INVENTOR.
JAMES R. WHITTEMORE
BY James H. Phillips
ATTORNEY

RETRACTABLE VEHICLE COVER

This invention relates to a retractable vehicle top and, more particularly, to a top utilized as an accessory for covering normally open-topped vehicle compartments.

Accessory cover apparatus for closing normally open compartments in a vehicle and which provide for a raised position in which the cover is raised upwardly to provide access to the interior of the compartment are known in the art. However, the prior art covers, as applied, for example, to the traditional open bed of the well known pickup truck, have been unduly complex and sufficiently difficult to manufacture as to preclude their acceptance on a commercial basis. The complexity of the prior art covers, further, renders such covers susceptible both to operational failure and actual breakage. Additionally, the mechanisms of the prior art covers have the added disadvantage of taking up an undesirable amount of valuable space within the compartment to be covered.

It is therefore a broad object of this invention to provide an improved cover for a normally open-topped vehicle compartment.

It is a further object of this invention to provide such a cover which utilizes a simple, efficient, and reliable mechanism.

It is a still further object of this invention to incorporate into such mechanism artificial counterbalancing means such that the cover may be easily raised and lowered.

A still further object of this invention is to provide such a cover which is inexpensive to manufacture as an accessory and may be readily incorporated into an existing vehicle.

These and other objects of the invention will become more readily apparent to those conversant with the art through a perusal of the following specification taken in conjunction with the subjoined claims and the drawings of which:

FIG. 1 is a perspective view illustrating the installation of the cover comprising the present invention on a pickup truck and disposed in the open position;

FIG. 2 is a cross-sectional view illustrating the disposition of the various mechanism components when the cover is in its uppermost position;

Figure 3:
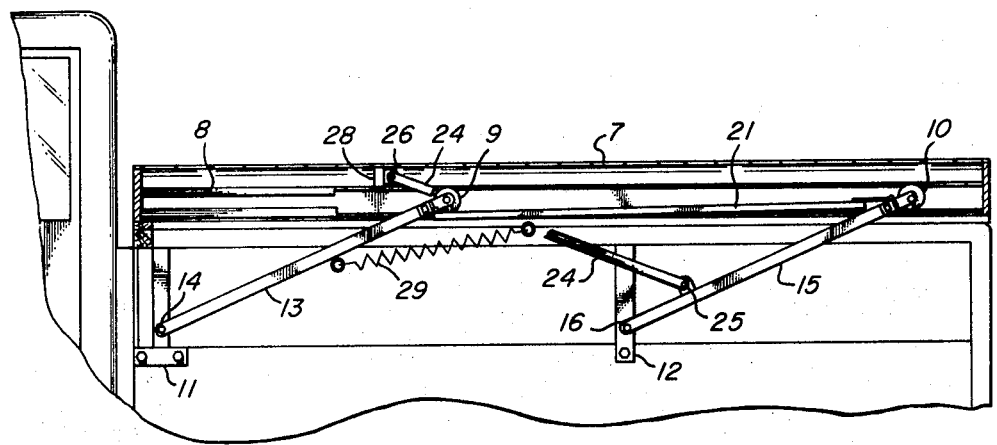
FIG. 3 is a cross-sectional view illustrating the disposition of the various mechanism components when the cover is in its closed position.

Referring now to FIG. 1, a typical installation for the cover of the present invention is depicted on a pickup truck 1 with the traditional bed consisting of a forward wall 2, side walls 3 and 4, and a rear wall or gate 5, all of which cooperate with a bed floor 6 to define a vehicular open-topped compartment. A roof 7 is vertically movably fixed to the truck bed by means of a mechanism to be described in detail below. In FIG. 1, the roof 7 is depicted in its uppermost position such that the relationship between a peripheral, downwardly extending flange portion 8 to the periphery of the walls 2, 3, 4, 5 of the truck bed is apparent; that is, closely fitting over the outer periphery of the walls.

Figure 4:
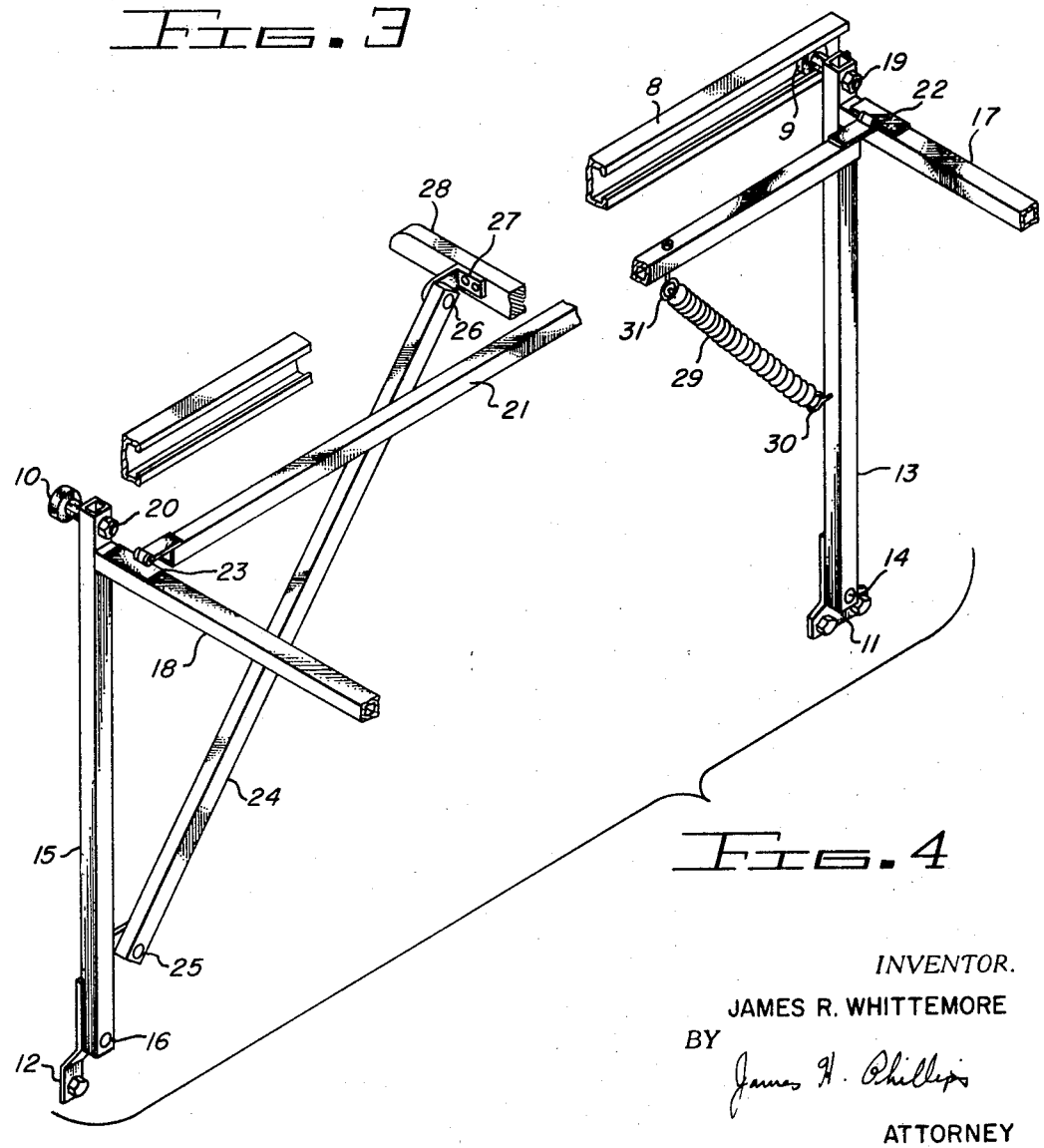
FIG. 4 is a detail perspective view of the left half of the translating mechanism, the right half being a mirror image.

Referring briefly to FIG. 2, it will be observed that an inwardly opening channel 8 is fixed to the interior of the roof 7 on each side for receiving rollers 9 and 10 which provide vertical support for the roof 7. For convenience in describing the invention, it will be understood that the mechanism illustrated in each of the figures has a corresponding mirror image mechanism on the opposite side of the compartment. FIGS. 1, 2, and 3 illustrate the right side mechanism, whereas FIG. 4 illustrates the mirror image left side mechanism. Identical reference numbers will be utilized to identify the mirror image components for the sake of clarity.

The manner in which the various elements of the mechanism are fitted together to cooperate functionally is perhaps best understood from FIG. 4. A front bracket 11 and a rear bracket 12 serve to fix the cover mechanism to the interior of the truck bed. As shown in FIGS. 2 and 3, the front brackets 11 are positioned closely adjacent the forward bed wall 2 while the rear brackets 12 are disposed somewhat rearwardly of the center of the truck bed. The brackets 11 and 12 may be bolted, welded, or secured to the bed interior by any convenient means suitable to the particular application.

Referring again to FIG. 4, a leg 13 of a first, forwardly inverted "U" frame member is secured to the bracket 11 for pivotal movement about an axis 14 which may comprise a loose fitting bolt, rivet, or the like. Similarly, a leg 15 of a second, rear inverted "U" frame member is pivoted about an axis 16. Each of the legs 13 and 15 extend upwardly beyond corresponding horizontal members 17 and 18 of the first and second frame members to provide for the outwardly extending rollers 9 and 10 which may be secured to the upper ends of the legs 13 and 15 by conventional nut and bolt combinations 19 and 20 or by equivalent means.

A fore and aft link 21 is hingedly secured to the horizontal member 17 by means of the hinge 22 and to the horizontal member 18 by means of the hinge 23. The length of the fore and aft link 21 and the hinges 22 and 23 separate the horizontal members 17 and 18 to a distance equal to the distance between the axes 14 and 15.

A guide link 24 is pivotally fixed at its lower end to the leg 15 at an axis 25 which is above the axis 16 and is pivotally secured at its upper end to a small bracket 27 by means of an axis 26. The bracket 27 is, in turn, fixed to a transverse beam 28 which is permanently attached to the underside of the roof 7.

A spring 29 in tension extends at an angle between the leg 13 and the fore and aft link 21. The spring 29 is fixed in place through the use of conventional eye bolts 30 and 31 as will be apparent from FIG. 4. In the fully upwardly extended position depicted in FIGS. 1, 2, and 4, a spring 29 is in tension, but less so than in the closed position illustrated in FIG. 3. The office of the spring 29 will become more readily apparent as the description proceeds.

A comparison of the relative disposition of the mechanism components in the fully up position and the fully down, closed position may be taken by comparing FIGS. 2 and 3. In the fully upwardly extended position of FIG. 2, the legs 13 and 15 of two inverted "U" frame members are vertically disposed such that the rollers 9 and 10 lie directly above the axes 14 and 16. When the cover 7 is lowered, the frame members pivot rearwardly and in unison being tied together at the top by the fore and aft links 21. The rollers 9 and 10 thus move rearwardly to assume the terminal position shown in FIG. 3 at which the cover is in the fully closed position. The geometry of fixed axes 16 and 26 and the axis 25 which moves in an arc about the axis 16, cooperate to lower the roof 7 vertically until it rests over the periphery of the compartment comprising the walls 2, 3, 4, and 5. As the mechanism is rolled, the springs 29 are stretched into a higher state of tension than that of the fully open position. Hence, when it becomes necessary to raise the cover, the spring 29 provides a positive aiding force to render a counterbalancing effect such that the manual force required is slight. Since the springs 29 are still under tension when the mechanism is in the fully raised position, that position will be maintained until the cover is manually lowered.

Referring again to FIG. 1, it will be noted that the rear wall 5 of the open-topped compartment may be the usual rearwardly opening tail gate which swings downwardly on hinges 32 and 33. By providing locking apparatus 34, or any other equivalent locking apparatus well known in the art, which latches to an opening 35 on the upper edge of the gate, the compartment may be completely locked such that the cover cannot be raised nor can the tail gate be lowered. To provide stability in the closed position, conventional snap latches 36 and 37 are provided. Thus, to raise the cover, the catches 36 and 37 are released, and the locking apparatus 34 is unlocked after which the cover may be raised vertically with a small force. Loading into the compartment may be accomplished with the cover in the up position or, with the tail gate 5 lowered in the down position.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. In a vehicle:
   A. a normally open-topped compartment comprising a floor, a forward wall, first and second side walls, and a rear wall; and
   B. a two position, vertically movable accessory cover for said compartment comprising:
   1. a roof element having a downwardly extending flange portion substantially corresponding to the outer periphery of the walls of said compartment,
      a. said flange portion including first and second inwardly opening fore and aft channels mounted, respectively, on the interior of the sections of said flange portion corresponding to said first and second side walls;
   2. first and second brackets in the interior of said compartment secured, respectively, to said first and second side walls proximate said forward wall;
   3. third and fourth brackets in the interior of said compartment secured, respectively, to said first and second side walls rearwardly of the center of said side walls and directly opposite one another;
   4. a first inverted "U" frame member including first and second legs and a first crossmember, said first and second legs being pivotally secured, respectively, to said first and second brackets, said first inverted "U" frame member including first and second rollers mounted, respectively, on truncated extensions of said first and second legs outboard of and above said first crossmember, said first and second rollers fitting, respectively, into said first and second channels for fore and aft rolling movement therein;
   5. a second inverted "U" frame member including third and fourth legs and a second crossmember, said third and fourth legs being pivotally secured, respectively, to said third and fourth brackets, said second inverted "U" frame member including third and fourth rollers mounted, respectively, on truncated extensions of said third and fourth legs, outboard of and above said second crossmember, said third and forth rollers fitting, respectively, into said first and second channels for fore and aft rolling movement therein;
   6. first and second fore and aft link members each extending between said first and second crossmembers of said first and second inverted "U" frame members, each end of said first fore and aft link being hingedly secured to the corresponding one of said crossmembers proximate the respective first legs of said first and second "U" frame members, and each end of said second fore and aft link being hingedly secured to the corresponding one of said crossmembers proximate the respective second legs of said first and second "U" frame members;
   7. first and second guide links, said first and second guide links being pivotally secured, respectively, at their lower ends to said third and fourth legs above the respective points of attachment of said third and fourth legs to said third and fourth brackets, said first guide link being pivotally secured at its upper end to said cover at a position forward of said third bracket rearward of said first bracket, and said second guide link being pivotally secured at its upper end to said cover at a position forward of said fourth bracket and rearward of said second bracket;
   8. a first tension spring fixed between said first fore and aft link and said first leg and a second tension spring fixed between said second fore and aft link and said second leg;
   whereby said cover has a first, closed position, in which said first and second inverted "U" frame members are pivoted equally rearwardly and said first and second spring members are in a first tensioned state; and whereby said second cover has a second, open position in which said first and second "U" frame members are vertically disposed and said first and second spring members are in a second state of tension, said springs being under less tension in said second state than in said first state.

2. The apparatus of claim 1 in which said rear wall is hingedly fixed to said floor for pivotal movement between a vertical position and a horizontal position.

3. The apparatus of claim 1 which includes means for locking said cover in said closed position.

* * * * *